United States Patent Office 3,801,596
Patented Apr. 2, 1974

3,801,596
BASIC DYES OF THE NAPHTHOLACTAM SERIES
Hans Baumann, Ludwigshafen, Andreas Einwiller, Lampertheim, and Guenter Hansen, Ludwigshafen, Germany, assignors to Badische Anilin- & Soda-Fabrik Aktiengesellschaft, Ludwigshafen, Germany
No Drawing. Filed Sept. 1, 1970, Ser. No. 68,765
Claims priority, application Germany, Sept. 4, 1969,
P 19 44 797.3
Int. Cl. C07d 27/46
U.S. Cl. 260—326.62          4 Claims

ABSTRACT OF THE DISCLOSURE

Basic dyes having the Formula I:

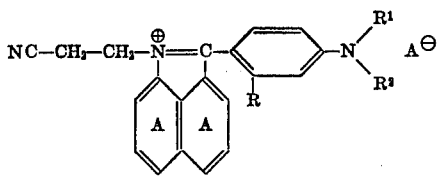

where R is hydrogen, chlorine, methyl, methoxy, ethoxy, acetylamino or propionylamino, $R^1$ is unsubstituted or substituted alkyl, aralkyl or aryl, $R^2$ is hydrogen or unsubstituted or substituted alkyl or aralkyl $R^1$ and $R^2$ together with the nitrogen denote the radical of a heterocyclic ring and $A^\ominus$ is an anion, the naphthalene rings A if desired bearing chlorine, bromine or unsubstituted or substituted sulfonamide groups as substituents.

---

The present invention relates to the basic dyes of Formula I above. As suitable substituents, examples of substituents $R^1$ are methyl, ethyl, propyl, butyl, β-hydroxyethyl, β-cyanoethyl, β-chloroethyl, benzyl, phenylethyl, phenyl, ethoxyphenyl and methoxyphenyl, $R^2$ may be for example methyl, ethyl, propyl, butyl, β-hydroxyethyl and β-cyanoethyl.

Those dyes are of particular industrial interest which have the general formula

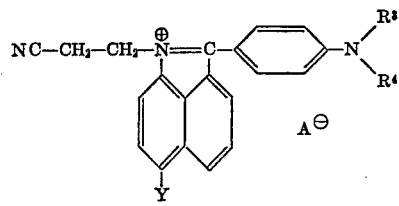

where $R^3$ is alkyl having 1 to 4 carbon atoms, β-hydroxyethyl, β-cyanoethyl, β-chloroethyl, benzyl, β-phenylethyl, phenyl or ethoxyphenyl, $R^4$ is alkyl having 1 to 4 carbon atoms, β-hydroxyethyl, β-cyanoethyl, β-chloroethyl or hydrogen, Y is hydrogen, chlorine, bromine or a N,N-disubstituted sulfonamide group, and $A^\ominus$ is an anion.

Substituted sulfonamide groups Y are for example N,N-dimethylsulfonamide, N,N-diethylsulfonamide, N,N-dibutylsulfonamide, or the groups which may be identified as morpholino sulfonyl, piperidino sulfonyl and pyrrolidino sulfonyl.

Anions $A^\ominus$ include the chloride, bromide, nitrate, sulfate, methosulfate, ethosulfate, benzene sulfonate, toluene sulfonate, formate, acetate, tetrafluoborate and tetrachlorozincate.

For the production of dyes of Formula I, naphtholactams having the General Formula II:

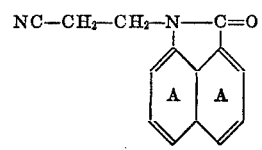

may be reacted with amines having the General Formula III:

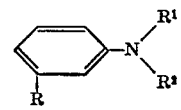

in the presence of condensing agents which eliminate water, R, $R^1$ and $R^2$ in the said formulae having the meanings given above and the rings A if desired bearing the substituents given above.

Examples of condensing agents capable of eliminating water are $PCl_5$, $POCl_3$, $COCl_2$, $SOCl_2$, $SO_2Cl_2$, $AlCl_3$, $ZnCl_2$, or mixtures thereof. The reaction may be carried out without solvents or in the presence of inert solvents such as hydrocarbons or chlorinated hydrocarbons, e.g. toluene, xylene, chlorobenzene, dichlorobenzene, ethylene chloride or chloroform.

Examples of components of Formula II are N-(β-cyanoethyl)naphtholactam, 6-bromo - N - (β-cyanoethyl) naphtholactam, and N - (β - cyanoethyl)naphtholactam-6-sulfonic acid diethylamide, dimethylamide, pyrrolidide, morpholide or piperidide. They may be obtained by the reaction of acrylonitrile with naphtholactam or naphtholactam derivatives in the presence of basic condensing agents. Introduction of any substituents (chlorine, bromine, sulfonamide) may be effected before or after the reaction with acrylonitrile.

Basic condensing agents for introducing the radical $CH_2CH_2CN$ are for example sodium methoxide, sodium ethoxide and trimethylbenzyl ammonium hydroxide.

Examples for components of Formula III are N,N-dialkylanilines, N,N-dialkyl - m - toluidines, diphenylamine and N-alkyldiphenylamines that may bear alkyl, acylamino or alkoxy radicals as substituents in the aryl radical. Specific compounds are dimethylaniline, dibutylaniline, dimethyl-m-toluidine, diethyl-m-toluidine, dibutyl-m-toluidine, diethyl-m-chloroaniline, N-β-cyanoethyl-N-butylaniline, N-β-hydroxyethyl-N-ethylaniline, 3-diethylaminoacetanilide, N - β-acetoxyethyl-N-ethyl-m-toluidine, N-phenylmorpholine, N-ethyldiphenylamine, N-methyl-4-ethoxydiphenylamine, N - α - cyanoethyl-N-methylaniline and N-α-cyanoethyl-N-ethylaniline.

The dyes of Formula I are suitable for dyeing tannin-treated cotton, leather, paper, or inks for ball point pens, and particularly for dyeing and for printing textiles or other materials of anionically modified polyesters and acrylonitrile polymers.

The water-soluble blue to greenish blue dyes give deep blue colorations very fast to light and wet treatments on textile materials of acrylonitrile polymers. As compared with comparable known dyes, the new dyes having an N-methyl or N-ethyl naphtholactam component exhibit a tinctorially valuable bathochromic shift from blue violet toward blue and many of them also have improved light-fastness. Moreover, the dyes of the invention are distinguished by a neutral shade in artificial light.

The invention is further illustrated by the following examples in which parts and percentages are by weight unless otherwise specified.

EXAMPLE 1

22.2 parts of N-β-cyanoethyl-peri-naphtholactam, 8 parts of zinc chloride and 60 parts of phosphorus oxychloride are heated at 110° C. for 30 minutes.

Then a solution of 18 parts of diethylaniline in 70 parts of ethylene chloride is slowly added. The whole is heated for three hours at 80° C., the reaction mixture poured into water and the ethylene chlorine distilled off.

The crystalline dye of the formula

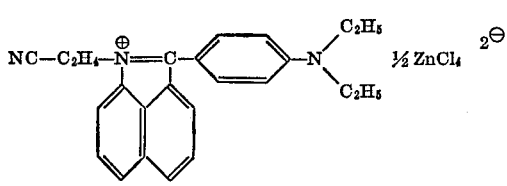

which precipitated dyes acrylonitrile polymers fast blue shades.

EXAMPLE 2

22 parts of N-β-cyanoethyl-peri-naphtholactam and 85 parts of phosphorus oxychloride are heated at 110° C. for 40 minutes. Then 15 parts of dimethylaniline is added and the temperature kept at 95° C. for five hours. The mixture is poured into ice water and neutralized with sodium acetate solution. The resultant blue dye has the formula

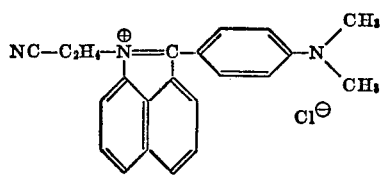

EXAMPLE 3

30.1 parts of 6-bromo-N-(β-cyanoethyl)-peri-naphtholactam, 150 parts of phosphorus oxychloride and 10 parts of zinc chloride are kept at 115° C. for one hour with stirring. 24 parts of N-β-cyanoethyl-N-butylaniline is slowly added and the whole heated for four hours under reflux. The mixture is then poured onto ice to yield the blue dye of the formula

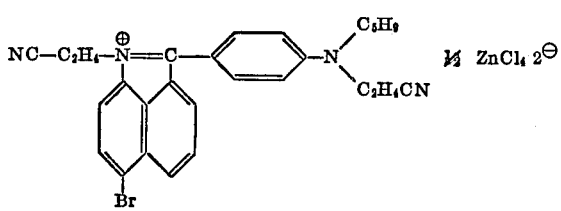

in a good yield.

EXAMPLE 4

22 parts of N-(β-cyanoethyl)-peri-naphtholactam, 80 parts of phosphorus oxychloride and 7 parts of zinc chloride are heated for 30 minutes at 110° C. Then 26.3 parts of N-(4-ethoxy)-phenyl-α-naphthylamine dissolved in 100 parts of ethylene chloride is slowly added to the dark brown solution in the course of 20 minutes. The whole is heated for 3 hours under reflux, the mixture poured into hot water and the ethylene chloride distilled off. The dye which dyes fibers of polyacrylonitrile bluish green shades is precipitated on cooling. It has the formula

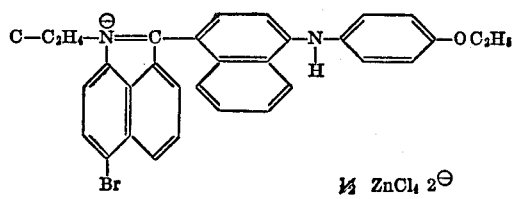

EXAMPLE 5

37 parts of N-(β-cyanoethyl)-peri-naphtholactam-6-sulfonic acid morpholide, 75 parts of phosphorus oxychloride and 10 parts of zinc chloride are added together and the mixture is kept at 115° C. for 40 minutes. Then a solution of 18 parts of N-phenylmorpholine in 100 parts of chloroform is slowly added and the whole heated for four hours under reflux. The reaction mixture is poured into hot water and the chloroform removed by distillation. Upon cooling, the dye of the formula

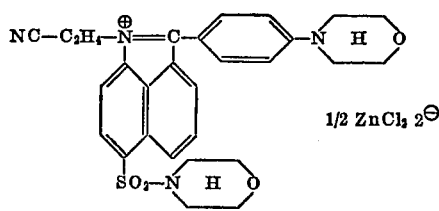

precipitates in crystalline form. It dyes polyacrylonitrile fibers fast blue shades.

EXAMPLE 6

32.9 parts of N-(β-cyanoethyl)-peri-naphtholactam-6-sulfodimethylamide, 75 parts of phosphorus oxychloride and 8 parts of zinc chloride are kept at 110° C. for 30 minutes with stirring. 27.5 parts of N-β-phenylethyl-N-β-cyanoethylaniline is added and the whole heated under reflux for four hours. By pouring the mixture into ice water and neutralizing the strongly acid solution the blue dye of the formula

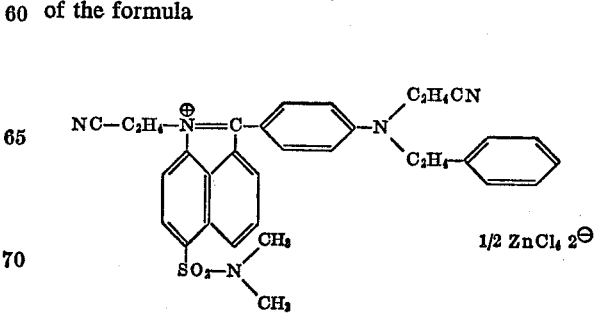

is obtained in a good yield.

By following the procedures described in the above examples and using the components specified below, dyes are obtained that dye acrylonitrile polymers in the shades indicated:

| Ex. | Naphtholactam | R being— (of phenyl–R) | Shade or dyeing on acrylonitrile polymer |
|---|---|---|---|
| 7 | NC—C$_2$H$_4$—N—C=O (naphtholactam) | —N(CH$_3$)(CH$_3$) | Blue. |
| 8 | Same as above | —N(C$_2$H$_5$)(C$_2$H$_5$) | Do. |
| 9 | do | —N(C$_4$H$_9$)(C$_4$H$_9$) | Do. |
| 10 | do | —N(CH$_3$)(C$_2$H$_4$CN) | Blue violet. |
| 11 | do | —N(C$_4$H$_9$)(C$_2$H$_4$CN) | Blue. |
| 12 | do | —N(C$_2$H$_5$)(C$_2$H$_4$OH) | Do. |
| 13 | do | —N(C$_2$H$_4$OH)(C$_2$H$_4$OH) | Violet. |
| 14 | do | —N(C$_2$H$_5$)(CH$_2$—C$_6$H$_5$) | Blue. |
| 15 | do | —N(C$_2$H$_5$)(C$_2$H$_4$CN) | Reddish blue. |
| 16 | do | —N(C$_2$H$_4$CN)(C$_2$H$_4$—C$_6$H$_5$) | Blue. |
| 17 | do | —NH—C$_6$H$_5$ | Do. |
| 18 | do | —N(C$_2$H$_5$)—C$_6$H$_5$ | Do. |
| 19 | do | —N(C$_2$H$_4$CN)(C$_3$H$_7$) | Violet. |
| 20 | do | —N(C$_2$H$_5$)(CH$_2$—C$_6$H$_5$) | Do. |
| 21 | do | —N(CH$_3$)(CH$_2$—C$_6$H$_5$) | Do. |

| Ex. | Naphtholactam | R being (in ⌬—R) | Shade of dyeing on acrylonitrile polymer |
|---|---|---|---|
| 22 | NC—C₂H₄—N—C=O / naphthalene / SO₂—N(CH₃)₂ | —N(CH₃)₂ | Blue. |
| 23 | Same as above | —N(C₂H₅)₂ | Do. |
| 24 | do | —N(C₄H₉)₂ | Do. |
| 25 | do | —N(CH₃)(C₂H₄CN) | Do. |
| 26 | do | —N(C₂H₅)(C₂H₄CN) | Do. |
| 27 | do | —N(C₄H₉)(C₂H₄CN) | Do. |
| 28 | do | morpholino (N-H, O ring) | Do. |
| 29 | do | —N(C₂H₅)(CH₂—C₆H₅) | Do. |
| 30 | do | —N(C₂H₄CN)(C₂H₄—C₆H₅) | Do. |
| 31 | do | —NH—C₆H₅ | Do. |
| 32 | do | —N(CH₃)—C₆H₅ | Do. |
| 33 | do | —N(C₂H₅)—C₆H₅ | Do. |
| 34 | NC—C₂H₄—N—C=O / naphthalene / Br | —N(CH₃)₂ | Do. |
| 35 | Same as above | —N(C₂H₅)₂ | Do. |
| 36 | do | —N(C₄H₉)₂ | Do. |
| 37 | do | —N(C₂H₅)(C₂H₄CN) | Do. |

| Ex. | Naphtholactam | ⬡—R  R being— | Shade of dyeing on acrylonitrile polymer |
|---|---|---|---|
| 38 | Same as Example 34 | N(C₄H₉)(C₂H₄CN) | Blue. |
| 39 | NC—C₂H₄—N—C=O (naphtholactam with SO₂—N(H)(piperidine)) | N(CH₃)(CH₃) | Do. |
| 40 | Same as above | N(C₂H₅)(C₂H₅) | Do. |
| 41 | do | N(CH₃)(C₂H₄CN) | Do. |
| 42 | do | N(C₂H₅)(C₂H₄CN) | Do. |
| 43 | do | N(C₄H₉)(C₂H₄CN) | Do. |
| 44 | do | N(C₄H₉)(C₄H₉) | Do. |
| 45 | NC—C₂H₄—N—C=O (naphtholactam with SO₂—N(H)(morpholine)) | N(CH₃)(CH₃) | Do. |
| 46 | Same as above | N(C₂H₅)(C₂H₅) | Do. |
| 47 | do | N(C₄H₉)(C₄H₉) | Do. |
| 48 | do | N(C₂H₅)(C₂H₄CN) | Do. |
| 49 | do | morpholino | Do. |
| 50 | NC—C₂H₄—N—C=O (naphtholactam with SO₂—N(H)(pyrrolidine)) | N(CH₃)(CH₃) | Do. |
| 51 | Same as above | N(CH₃)(C₂H₄CN) | Do. |

| Ex. | Naphtholactam | R being— (phenyl-R) | Shade of dyeing on acrylonitrile polymer |
|---|---|---|---|
| 52 | Same as Example 50 | N(C$_2$H$_5$)$_2$ | Blue. |
| 53 | NC—C$_2$H$_4$—N—C=O (naphtholactam) | NH—C$_6$H$_4$—OC$_2$H$_5$ | Bluish green. |
| 54 | NC—C$_2$H$_4$—N—C=O (chloro-naphtholactam) | N(CH$_3$)$_2$ | Blue. |
| 55 | Same as above | N(C$_2$H$_5$)$_2$ | Do. |
| 56 | do | N(C$_2$H$_5$)(C$_2$H$_4$CN) | Do. |
| 57 | do | N(C$_4$H$_9$)(C$_2$H$_4$CN) | Do. |

We claim:

1. A compound of the formula

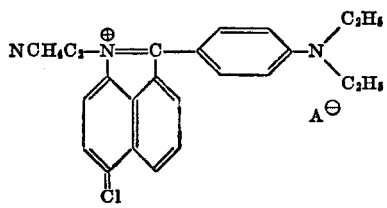

wherein A$^\ominus$ is an anion.

2. A compound of the formula

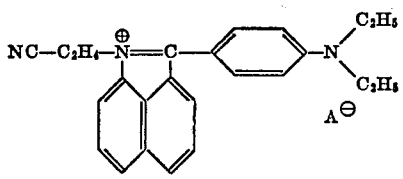

wherein A$^\ominus$ is an anion.

3. A compound of the formula

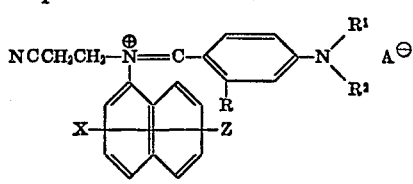

where:

R denotes hydrogen, chlorine, methyl, methoxy, ethoxy, acetylamino or propionyl amino, R$^1$ denotes alkyl of 1 to 4 carbon atoms, β-hydroxyethyl, β-cyanoethyl, β-chlorethyl, benzyl, β-phenylethyl, phenyl or ethoxyphenyl, R$^2$ denotes alkyl of 1 to 4 carbon atoms, β-hydroxyethyl, β-cyanoethyl or β-chloroethyl, R$^1$ and R$^2$ when taken together with the nitrogen form morpholino, pyrrolidino, piperidino, piperazino or N-methylpiperazino, X denotes hydrogen, chlorine, bromine, sulfonamide which is N-substituted by lower alkyl, pyrrolidino sulfonyl, piperidino sulfonyl or morpholino sulfonyl, Z denotes hydrogen, chlorine or bromine and A$^\ominus$ denotes an anion.

4. A compound of the formula

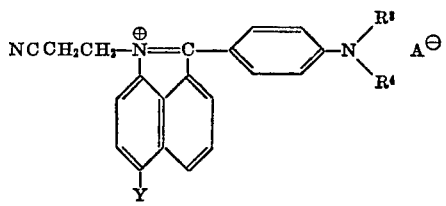

where:

R$^3$ denotes alkyl of 1 to 4 carbon atoms, β-hydroxyethyl, β-cyanoethyl, β-chloroethyl, benzyl, β-phenylethyl, phenyl or ethoxyphenyl, R$^4$ denotes hydrogen, alkyl of 1 to 4 carbon atoms, β-hydroxyethyl, β-cyanoethyl or β-chloroethyl, R$^3$ and R$^4$ when taken together with the nitrogen form morpholino, pyrrolidino, piperidino, piperazino or N-methylpiperazino, Y denotes hydrogen, chlorine, bromine, sulfonamide N-substituted by lower alkyl, pyrrolidino sulfonyl, piperidino sulfonyl or morpholino sulfonyl, and A$^\ominus$ denotes an anion.

No references cited.

NICHOLAS S. RIZZO, Primary Examiner

J. TOVAR, Assistant Examiner

U.S. Cl. X.R.

260—242, 247.1, 247.5, 247.2 R, 268 TR, 270 R, 293.61, 326.3; 8—177 AB

UNITED STATES PATENT OFFICE
CERTIFICATE OF CORRECTION

PATENT NO. : 3,801,596
DATED : April 2, 1974
INVENTOR(S) : BAUMANN et al

It is certified that error appears in the above-identified patent and that said Letters Patent are hereby corrected as shown below:

In Column 1, Line 29, after the word "aralkyl" insert --,--

In Column 4, Line 9-21 (Formula of example 4), delete

"    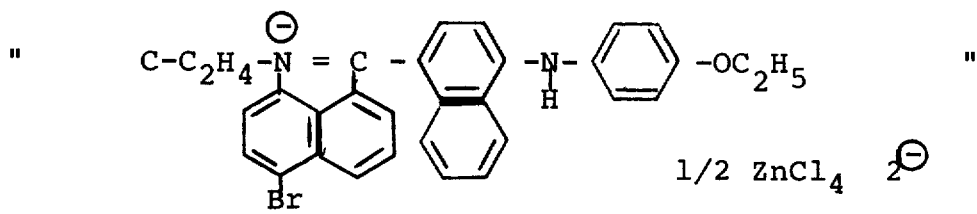    "

substitute

--    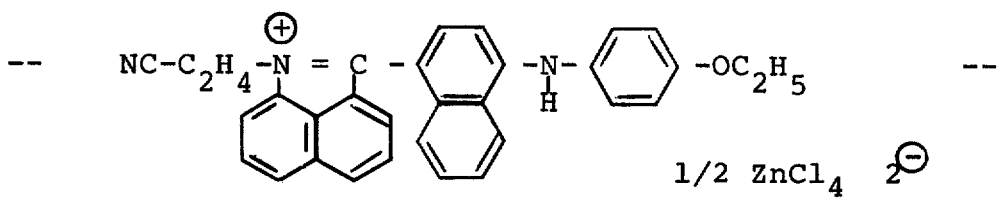    --

Signed and Sealed this

Thirteenth Day of July 1976

[SEAL]

*Attest:*

RUTH C. MASON
*Attesting Officer*

C. MARSHALL DANN
*Commissioner of Patents and Trademarks*